(No Model.) 4 Sheets—Sheet 2.

J. G. HOLCOMBE.
QUICK ACTION TRIPLE VALVE MECHANISM FOR FLUID PRESSURE BRAKES.

No. 582,204. Patented May 11, 1897.

Witnesses
Percy C. Bowen
Maurice J. Dioussa

Inventor
Joseph G. Holcombe,
by Whitman & Wilkinson
Attorneys (No Model.) 4 Sheets—Sheet 3.
J. G. HOLCOMBE.
QUICK ACTION TRIPLE VALVE MECHANISM FOR FLUID PRESSURE BRAKES.

No. 582,204. Patented May 11, 1897.

Witnesses
Percy C. Bowen
Maurice J. Sioussa

Inventor
Joseph G. Holcombe,
by Whitman & Wilkinson,
Attorneys.

(No Model.) 4 Sheets—Sheet 4.

J. G. HOLCOMBE.
QUICK ACTION TRIPLE VALVE MECHANISM FOR FLUID PRESSURE BRAKES.

No. 582,204. Patented May 11, 1897.

Witnesses
Percy C. Bowen
Maurice J. Sioussa

Inventor
Joseph G. Holcombe,
by Whitman & Wilkinson,
Attorneys.

THE NORRIS PETERS CO., PHOTO-LITHO., WASHINGTON, D. C.

United States Patent Office.

JOSEPH GALES HOLCOMBE, OF NEWPORT, OREGON, ASSIGNOR OF FORTY-NINE ONE-HUNDREDTHS TO ROYAL AUGUSTUS BENSELL, OF SAME PLACE.

QUICK-ACTION TRIPLE-VALVE MECHANISM FOR FLUID-PRESSURE BRAKES.

SPECIFICATION forming part of Letters Patent No. 582,204, dated May 11, 1897.

Application filed August 22, 1896. Serial No. 603,632. (No model.)

*To all whom it may concern:*

Be it known that I, JOSEPH GALES HOLCOMBE, a citizen of the United States, residing at Newport, in the county of Lincoln and State of Oregon, have invented certain new and useful Improvements in Quick-Action Triple-Valve Mechanism for Fluid-Pressure Brakes; and I do hereby declare the following to be a full, clear, and exact description of the invention, such as will enable others skilled in the art to which it appertains to make and use the same.

This invention relates to quick-acting triple valves for use in connection with automatic air-brake systems on railway-cars in which a slight lowering of the train-pipe pressure effects a gradual application of the brakes, while a sudden reduction of this pressure causes a quick application of the brakes.

Reference is had to the accompanying drawings, in which the same letters of reference indicate corresponding parts in the several views.

Figure 1:
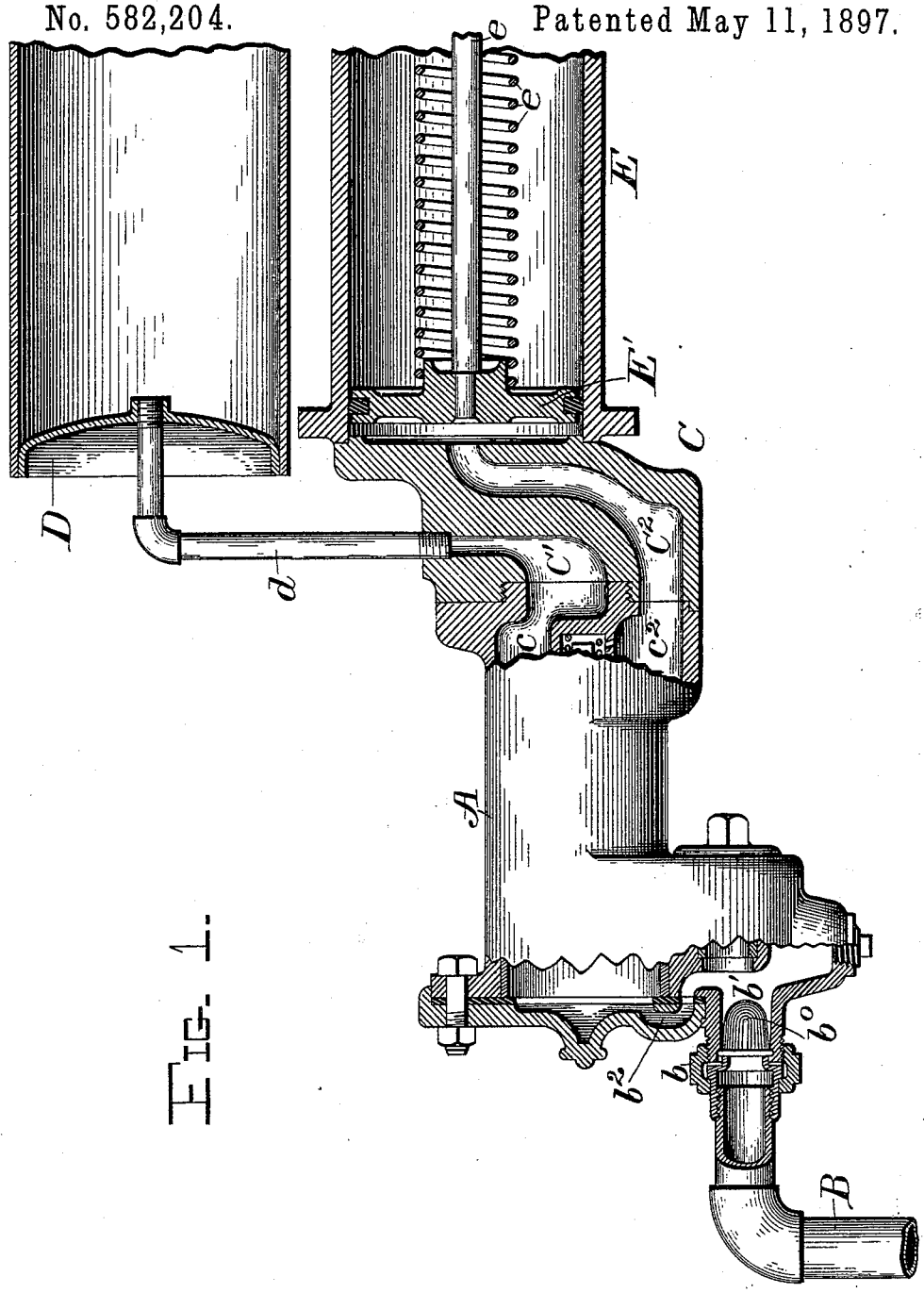
Figure 2:
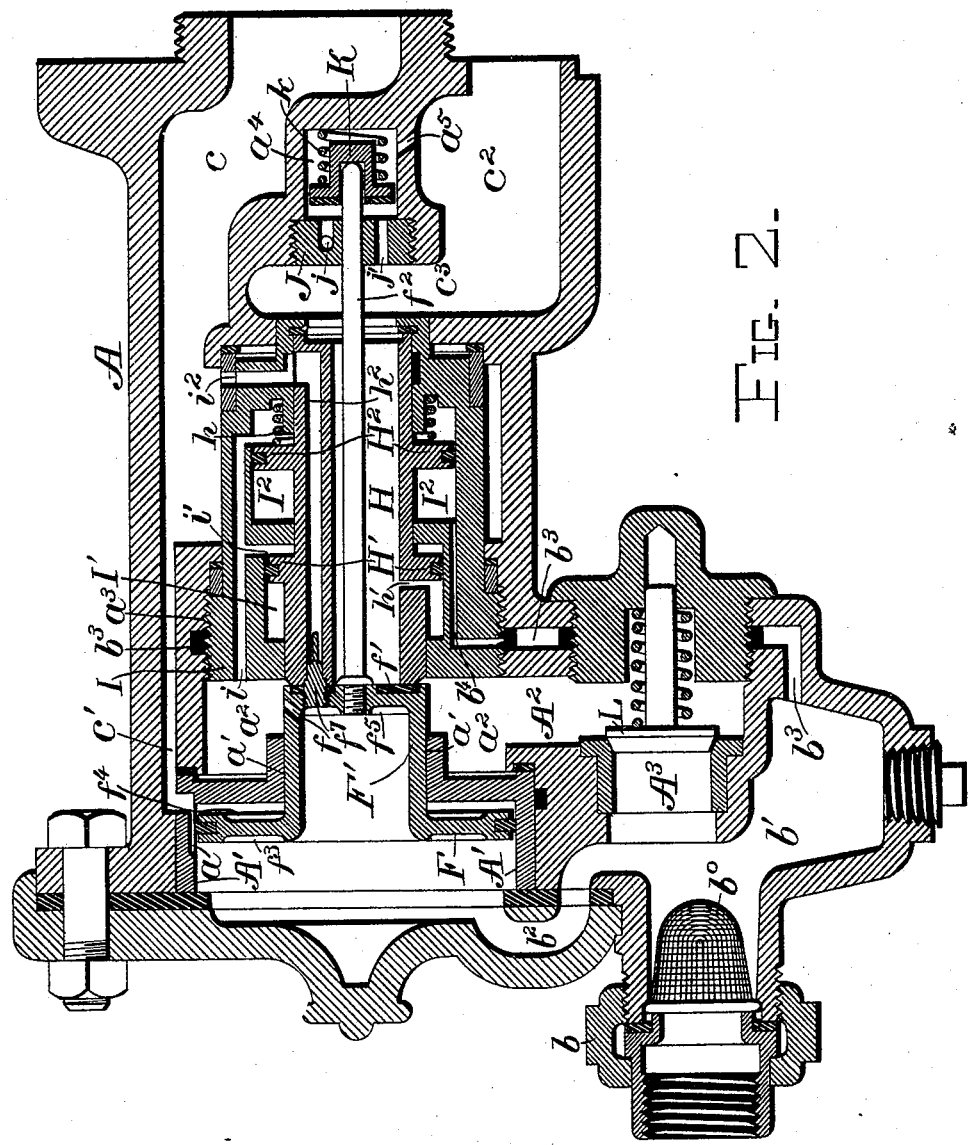
Figure 3:
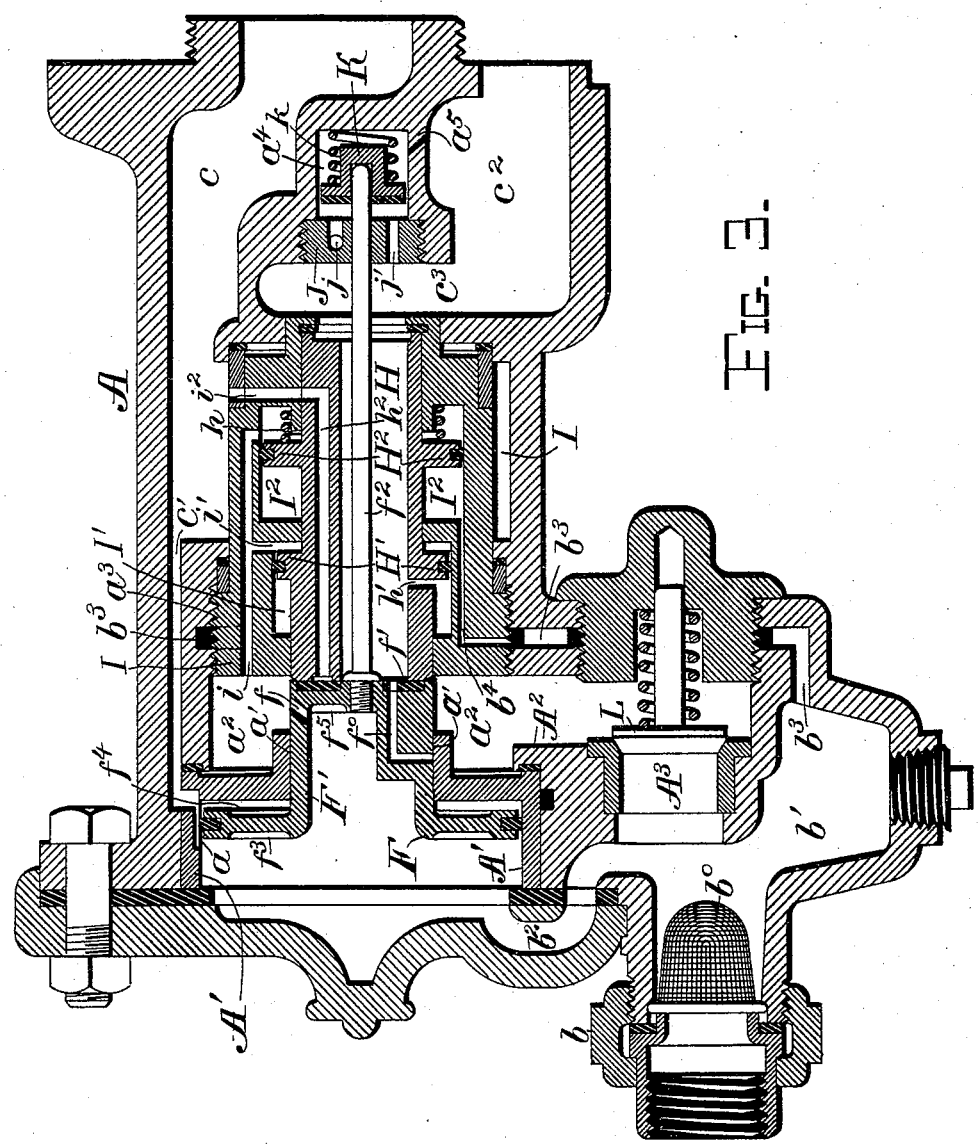
Figure 4:
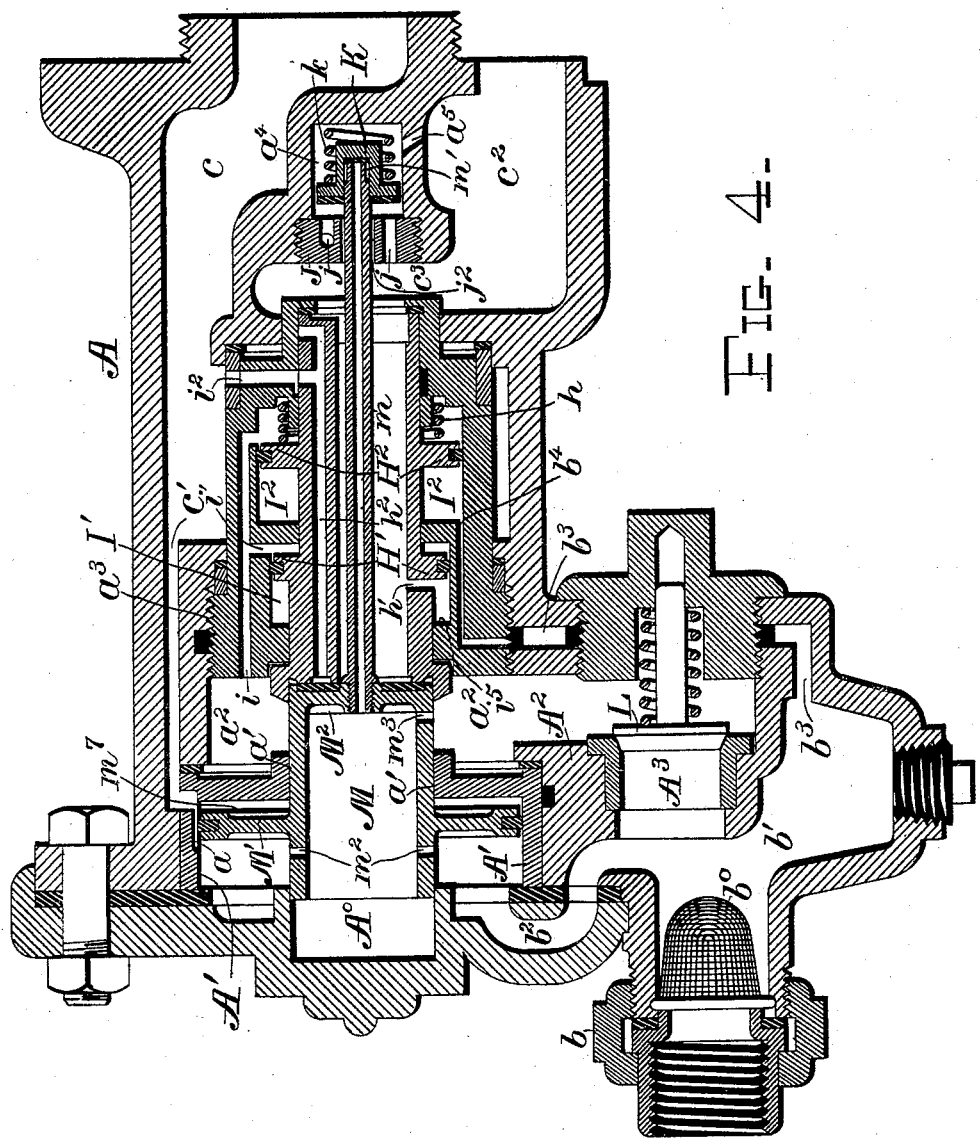

Figure 1 represents a view, partly in side elevation and partly in central section, of my improved valve, showing connections to the train-pipe, to the auxiliary reservoir, and to the brake-cylinder. Fig. 2 represents a central longitudinal section through the valve-casing and valve. Fig. 3 represents a similar view showing a slightly-modified form of valve, and Fig. 4 represents a similar view of another slight modification.

A designates the triple-valve casing, which is connected with the train-pipe B, as at $b$, and from which pipe the air under pressure enters the chamber $b'$, first passing through a strainer $b^0$. Upon the said valve-casing, at the opposite end to the train-pipe connection, is screwed a casting C, having passages $C'$ and $C^2$, communicating with the passages $c$ and $c^2$, respectively, in the valve-casing. The passage $C'$ in the said casing is connected by a pipe $d$ to the auxiliary reservoir D, and the passage $C^2$ is connected with the brake-cylinder E, which latter is provided with the usual piston $E'$, piston-rod $e$, and spring $e'$, connected to the brakes in the usual manner.

In the casing A, at the same end to which the train-pipe is connected, is formed a short cylinder $A'$, in which the main piston F is mounted. The central portion of this main piston F is made in the form of a hollow cylinder $F'$, which passes through a smaller cylindrical opening $a'$ in the head of the cylinder $A'$.

A port $f$ is cut in the cylindrical portion $F'$, opening into the chamber $a^2$. This port is of ample size and is not wholly cut off until piston F has reached its extreme traverse.

On the front of the cylindrical portion $F'$ of the piston F is a packing-ring $f'$, upon which is seated a cylindrical piston H, which moves in a casting I, bored out to receive it. The said casting I is screwed into the casing A, as at $a^3$, and in addition to being bored out to receive the cylindrical piston H the bore is enlarged at certain places to form cylinders $I'$ and $I^2$, the latter being larger than the former. Upon the outside of the cylindrical piston H are piston-rings $H'$ and $H^2$, fitting snugly in the cylinder $I'$ and in the cylinder $I^2$, respectively.

The piston-rod $f^2$ extends from the piston F through the central opening of the cylindrical piston H, through the passage $c^3$, and through the casting J into the valve K in the valve-chamber $a^4$.

The casting J is provided with two ports $j$ and $j'$, the port $j$ opening from the atmosphere into the valve-chamber $a^4$ and the port $j'$ connecting valve-chamber $a^4$ and the passage $c^3$. A port $a^5$ also admits air from the passage $c^2$ to the valve-chamber $a^4$, but on the opposite side of the valve from the ports $j$ and $j'$.

When the parts are in their normal position, as shown in Fig. 2 of the drawings, which would be when the brakes are off, the piston-rod $f^2$ will hold the valve K away from the ports in the casting J, thus allowing a free passage of air through the port $j$, the chamber $a^4$, and the ports $j'$ and $a^5$ to the passages $c^3$ and $c^2$ and thence to the brake-cylinder, thus maintaining atmospheric pressure in these several parts.

The valve K is provided with a spring $k$, which is just strong enough to move the valve K down upon the casting J and close the ports $j$ and $j'$ therein when the piston-rod $f^2$ is withdrawn from the said valve. The cylindrical piston H is also normally pressed upon by a spring $h$, which is just strong enough to move the said piston when the air-pressure is equal on both sides thereof.

In the part of the casing $A^2$ below the piston F an opening $A^3$ is formed, connecting the chambers $b'$ and $a^2$, which opening is closed by a spring-actuated check-valve L.

When air is forced through the train-pipes, it will enter the chamber $b'$ and pass through the passage $b^2$ into the cylinder $A'$ and into the hollow cylinder $F'$ of the piston F. A part of the air passes through the port $a$, some remaining on the other side of the piston F, while the major portion passes through the ports $c'$ and $c$ to the auxiliary reservoir D, which is thus filled with air at train-pipe pressure. Air will also pass through the port $f$ in the piston F and fill the chamber $a^2$ at the same pressure. From the chamber $a^2$ air will pass through the ports $i$ and $i'$ to the cylinders $I'$ and $I^2$ in front of the piston $H'$ and $H^2$. The passage $b^3$ will conduct air from the chamber $b'$ to the port $b^4$ and thence into the cylinder $I^2$ back of the piston $H^2$, thus maintaining train-pipe pressure on both sides of the piston $H^2$. The cylindrical piston H has a longitudinal port $h^2$, which communicates through the port $i^2$ with the passage $c$, and thus receives air under reservoir-pressure. The cylinder $I'$ is filled back of the piston $H'$ with air at atmospheric pressure through the port $h'$.

One face $f^3$ of the piston F is exposed to train-pipe pressure, and the opposite face $f^4$ is exposed to reservoir-pressure. These faces being equal would tend to balance the piston, but the area $f^5$, forming the head of the cylindrical portion $F'$ of the said piston, is also exposed to train-pipe pressure, while the opposite surface is exposed to atmospheric pressure through the cylindrical piston H. Thus the train-pipe pressure will tend to press the piston F against the cylindrical piston H.

The front area of the piston-ring $H'$ is made equal to the area of the piston F exposed to atmospheric pressure, and as this piston is exposed to train-pipe pressure on its front side and to atmospheric pressure through the port $h'$ on the other side the two pistons F and H will be pressed together and balanced. The piston-ring $H^2$ being exposed to train-pipe pressure on both sides will not affect the balance of the two pistons.

While in the above-described positions the brake-cylinder is open to atmospheric pressure through the ports $j$ and $j'$, and all the ports connecting the train-pipe and the reservoir to the brake-cylinder are closed.

Should a slight reduction be made in the train-pipe pressure, it would partly relieve the pressure in the chamber $b'$ and the passages $b^3$ and $b^4$ and the chamber $a^2$, and also in the passage $i$, through the ports $f$, while some reservoir-air will begin to flow back through the ports $a$. Thus the pressure would be reduced on the back of the piston F, and the reservoir-pressure on the front of the piston F and the train-pipe pressure on the piston-ring $H'$ will move the two pistons F and H backward. The first movement of the piston F will close the port $a$, thus preventing much air from the reservoir D from escaping. At the same time the piston-rod $f^2$ is withdrawn from the valve K, allowing the said valve to move up against the casting J and close the ports $j$ and $j'$ to the atmosphere. The backward movement of the two pistons will uncover the port $i^2$ and allow the reservoir-air to pass into the passage $c^3$ and through the chamber $c^2$ to the brake-cylinder E and thus apply the brakes in the usual way.

When air under pressure gets into the passage $c^2$, the port $a^5$ allows this air to pass into the valve-chamber $a^4$ and hold the valve K to its seat.

With a slight reduction in train-pipe pressure the pistons F and H will move together, because the sum of the areas $f^3$ and $f^5$ of the piston F exposed to train-pipe pressure is greater than the area $f^4$ exposed to reservoir-pressure, while the central portion of the piston F is exposed to atmospheric pressure through the hollow piston H. Thus, unless there be a great difference between the reservoir and the train-pipe pressures, the train-pipe pressure will be sufficient to overcome the greater pressure from the reservoir acting on a less area and will hold the piston F against the piston H, and were there no other forces at work the piston F would not budge for slight reductions in train-pipe pressure; but the piston-ring $H'$ has an area exposed to train-pipe pressure in the cylinder $I'$ equal to the area of the piston F exposed to atmospheric pressure and tending to push the piston H against the piston F, and when the counterbalancing train-pipe pressure is lowered the combined pressure on the area $f^4$ of the piston F and on the front of the piston-ring $H'$ will be sufficient to move both of the pistons together when the train-pipe pressure is slightly reduced, as in making an ordinary service stop.

The piston-ring $H^2$ acts as a governor, it being exposed to the train-pipe pressure in the chamber $a^2$ through the large port $i$ on its front side and to train-pipe pressure through the passage $b^3$ and the small port $b^4$ on the other side.

When the train-pipe pressure is reduced, a corresponding reduction takes place in the passage $b^3$, and the air in the cylinder $I^2$ behind the piston-ring $H^2$ will escape slowly through the small port $b^4$ and allow the piston H to move back only as fast as this air can escape, while the ample size of ports $f$ and $i$ will cause the pressure upon the front of the piston $H^2$ to remain substantially equal to train-pipe pressure.

When an emergency stop is to be made, as in case of danger, a sudden and greater reduction is made in the train-pipe pressure, in which case the reservoir-pressure on the area $f^4$ of the piston F in the passage $h^2$ will force the piston F suddenly backward. This movement the piston H will be unable to follow, as the air in the rear part of the cylinder I² cannot escape fast enough through the small port $b^4$. Therefore the two pistons will separate and the air in the chamber $a^2$, as well as the reservoir-air coming through the port $i^2$ and the passage $h^2$, will pass through the open cylindrical piston H to the passage $c^3$ and thence to the brake-cylinder. When the pressure in chamber $a^2$ falls below the train-pipe pressure, by its expansion into the brake-cylinder through the large central opening of piston H, the check-valve L will be raised and the pressure from the train-pipe will enter directly into the chamber $a^2$ and also pass through the piston H to the brake-cylinder, thus combining in the brake-cylinder the pressure of the air in the reservoir and in the train-pipe to apply the brakes.

In making an emergency stop, in order to fully exhaust the check-valve chamber $a^2$ of the train-pipe pressure before the reservoir-pressure begins to pass to the brake-cylinder, I provide a valve $f^7$, secured to the cylinder-head $f^5$, which valve projects for a short distance into the rear end of the passage $h^2$ and blocks the said passage during a short portion of the backward travel of the piston F. Before this valve unveils the passage $h^2$ the pressure in the chamber $a^2$ is greatly reduced, and the valve L permits train-pipe pressure to act practically simultaneously with the reservoir-pressure coming through the passage $h^2$.

In order to release the brakes, the pressure in the train-pipe is raised until the piston F is forced forward to its normal position, when the port $i^2$ will be closed by the piston H and the piston-rod $f^2$ will raise the valve $k$ and allow the air from the brake-cylinder to escape through the ports $j'$ and $j$.

In Fig. 3 is shown a modification in which the port $i^2$ is placed farther back, so that it will not be opened when the piston H moves backward, but in lieu thereof a port $f^0$ is provided, passing through the outer walls of the piston F, the open end of the said port being within the cylinder $a'$, and when the valves move backward this port $f^0$ will open into the cylinder A' and admit the reservoir-air in front of the piston to the inside of the cylindrical piston H, and thence to the brake-cylinder, as before. In making the emergency stop the action is precisely as before. The valve $f^7$ (shown in Fig. 2) may also be applied to this form of device, if desired.

In Fig. 4 is shown another modification in which the main piston M is tubular in form, having a piston-ring M', which moves in the cylinder A'. The open rear end of the said piston moves in a cylindrical chamber $A^0$. The front end is closed, as at $M^2$, but opens at its center into a hollow piston-rod $m$, which extends into the atmospheric valve K, where it rests against a suitable packing-ring. The end of the piston-rod is reduced, as at $m'$, to allow a passage for the air when the rod is partly withdrawn from the atmospheric valve K.

The air from the train-pipe normally fills the cylinder A' and passes through the port $m^2$ into the tubular piston M and the chamber $A^0$, a part of the air passing through the port $m^3$ and filling the chamber $a^2$. The auxiliary reservoir is filled by the air passing through the small port $a$ and the passages $c'$ and $c$.

A slight reduction in train-pipe pressure will cause both the pistons M and H to move backward, closing the ports $m^2$ and $m^3$ and allowing the atmospheric valve K to close the ports $j$ and $j'$, and then withdrawing the hollow piston-rod from the said valve far enough to allow the air to pass around the reduced end $m'$ thereof and through the opening $j^2$ in the casting J to the passage $c^3$, and thence to the brake-cylinder, thus admitting the air from the tubular piston M and the chamber $A^0$ to the brake-cylinder. This will cause the reservoir-pressure on the front face $m^7$ of the piston-ring M' to overbalance train-pipe pressure on the rear face and will move the piston M so as to open passage $h^2$ from the reservoir to the hollow portion of valve H without opening a passage from chamber $a^2$ to valve H.

The motion of the piston H is limited in the chamber I' by means of the shoulders $i^5$, so that the piston M will move away from the piston H at the end of the stroke. In the emergency stop a sudden and great reduction in the train-pipe pressure will cause a sudden backward movement of the piston M, causing the same to move away from the piston H, thereby opening the passage $h^2$ to the chamber $a^2$ and allowing the reservoir-air, as well as the air in the chamber $a^2$, to pass through the piston H to the brake-cylinder. In other respects the action is identical with the former valves.

It will be obvious that various modifications in the herein-described apparatus might be made which could be used without departing from the spirit of my invention.

Having thus described my invention, what I claim, and desire to secure by Letters Patent of the United States, is—

1. In a triple-valve mechanism, the combination with the outer casing with short cylinder and air-chamber in the rear end thereof and train-pipe and reservoir connection thereto, of the hollow main piston sliding in said short cylinder, the sliding hollow cylindrical piston in front of the main piston and normally bearing on a portion of the front face thereof, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

2. In a triple-valve mechanism, the combination with the outer casing with short cylinder and air-chamber in the rear end thereof and train-pipe and reservoir connection thereto, of the hollow main piston sliding in said short cylinder, the sliding hollow cylindrical piston in front of the main piston and normally bearing on a portion of the front face thereof, an air-passage normally opening into the air-brake passage, means operated by the motion of said main piston for closing said air-passage, means operated by a slight reduction of train-pipe pressure for simultaneously moving said piston and supplying reduced pressure to the brake-cylinder, and means operated by a sudden reduction of train-pipe pressure for separating said pistons and supplying great pressure to the brake-cylinder, substantially as described.

3. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing, of the hollow main piston sliding in said short cylinder, the sliding hollow cylindrical piston in front of the main piston and normally bearing on a portion of the front face thereof, means operated by a slight reduction of train-pipe pressure for simultaneously moving said pistons cutting off said connection to the atmosphere and supplying reduced pressure to the brake-cylinder, and means operated by a sudden reduction of train-pipe pressure for separating said pistons cutting off said connection to the atmosphere and supplying great pressure to the brake-cylinder, substantially as described.

4. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said casing, of the hollow main piston sliding in said short cylinder, the sliding hollow cylindrical piston in front of the main piston and normally bearing on a portion of the front face thereof, means operated by the motion of said main piston for closing the brake-cylinder exhaust, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

5. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing, of the hollow main piston sliding in said short cylinder, with ports therethrough, the sliding hollow cylindrical piston in front of the main piston and normally bearing on a portion of the front face thereof, with means for regulating the motion thereof, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

6. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing, of the hollow main piston sliding in said short cylinder, the sliding hollow cylindrical piston in front of the main piston and normally bearing on a portion of the front face thereof, with piston-rings on said cylindrical piston, and cylinders inclosing said piston-rings with ports to said cylinders, means operated by the motion of said main piston for closing the brake-cylinder exhaust, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

7. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing, of the hollow main piston sliding in said short cylinder, with a port extending through the walls thereof adapted to be closed near the end of the stroke of the main piston, the sliding hollow cylindrical piston in front of the main piston and normally bearing on a portion of the front face thereof, means operated by a slight reduction of train-pipe pressure for simultaneously moving said pistons, cutting off said connection to the atmosphere, and supplying reduced pressure to the brake-cylinder, and means operated by a sudden reduction of train-pipe pressure for separating said pistons, cutting off said connection to the atmosphere, and supplying great pressure to the brake-cylinder, substantially as described.

8. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said casing, of the hollow main piston sliding in said short cylinder, with a port extending through the walls thereof adapted to be closed near the end of the stroke of the main piston, the sliding hollow cylindrical piston in front of the main piston and normally bearing on a portion of the front face thereof, means operated by the motion of said main piston for closing the brake-cylinder exhaust, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

9. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing, of the hollow main piston sliding in said short cylinder, and having a greater surface on the rear thereof exposed to train-pipe pressure than on the front thereof, with a port extending through the walls thereof adapted to be closed near the end of the stroke of the main piston, with a portion of the front surface thereof normally exposed to atmospheric pressure, the sliding hollow cylindrical piston in front of the main piston and normally bearing on a portion of the front face thereof, with a portion of said piston next the main piston exposed to atmospheric pressure, the opposite side of said portion being exposed to train-pipe pressure, means operated by a slight reduction of train-pipe pressure for simultaneously moving said pistons, cutting off said connection to the atmosphere, and supplying reduced pressure to the brake-cylinder, and means operated by a sudden reduction of train-pipe pressure for separating said pistons, cutting off said connection to the atmosphere and supplying great pressure to the brake-cylinder, substantially as described.

10. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said casing, of the hollow main piston sliding in said short cylinder, and having a greater surface on the rear thereof exposed to train-pipe pressure than on the front thereof, with a port extending through the walls thereof adapted to be closed near the end of the stroke of the main piston, with a portion of the front surface thereof normally exposed to atmospheric pressure, the sliding hollow cylindrical piston in front of the main piston and normally bearing on a portion of the front face thereof, with a portion of said piston next the main piston exposed to atmospheric pressure, the opposite side of said piston being exposed to train-pipe pressure, means operated by the motion of said main piston for closing the brake-cylinder exhaust, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

11. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing with port located near the front face thereof, of the hollow main piston sliding in said short cylinder and closing said port early in its stroke, with a port through the walls of said piston, the sliding hollow cylindrical piston in front of the main piston and normally bearing on a portion of the front face thereof, with means for regulating the motion thereof, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

12. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing with port located near the front face thereof, of the hollow main piston sliding in said short cylinder, with a port through the walls of said piston, the sliding hollow cylindrical piston in front of the main piston and normally bearing on a portion of the front face thereof, with piston-rings on said cylindrical piston, and cylinders inclosing said piston-rings with ports to said cylinders, means operated by the motion of said main piston for closing the brake-cylinder exhaust, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

13. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing with port located near the front face thereof, of the hollow main piston sliding in said short cylinder and closing said port early in its stroke, with a port through the walls of said piston, the sliding hollow cylindrical piston in front of the main piston and normally bearing on a portion of the front face thereof with a longitudinal port therethrough, with means for regulating the motion thereof, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

14. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing, with port located near the front face thereof, of the hollow main piston sliding in said short cylinder with a port through the walls of said piston, the sliding hollow cylindrical piston in front of the main piston and normally bearing on a portion of the front face thereof with a longitudinal port therethrough, with piston-rings on said cylindrical piston, and cylinders inclosing said piston-rings with ports to said cylinders, means operated by the motion of said main piston for closing the brake-cylinder exhaust, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

15. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said casing, of the hollow main piston sliding in said short cylinder, with a port extending through the walls thereof adapted to be closed near the end of the stroke of the main piston, with a valve operated by the motion of said piston for closing the passage to the outer air, the sliding hollow cylindrical piston in front of the main piston and normally bearing on a portion of the front face thereof, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

16. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing, of the hollow main piston sliding in said short cylinder, and having a greater surface on the rear thereof exposed to train-pipe pressure than on the front thereof, with a port extending through the walls thereof adapted to be closed near the end of the stroke of the main piston, with a portion of the front surface thereof normally exposed to atmospheric pressure, the sliding hollow cylindrical piston in front of the main piston and normally bearing on a portion of the front face thereof, with a portion of said piston next the main piston exposed to atmospheric pressure, the opposite side of said piston being exposed to train-pipe pressure, a valve operated by the motion of the main piston for closing the passage to the outer air, means operated by a slight reduction of train-pipe pressure for simultaneously moving said pistons, and supplying reduced pressure to the brake-cylinder, and means operated by a sudden reduction of train-pipe pressure for separating said pistons, and supplying great pressure to the brake-cylinder, substantially as described.

17. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing, of the hollow main piston sliding in said short cylinder, and having a greater surface on the rear thereof exposed to train-pipe pressure than on the front thereof, with a port extending through the walls thereof adapted to be closed near the end of the stroke of the main piston, with a portion of the front surface thereof normally exposed to atmospheric pressure, the sliding hollow cylindrical piston in front of the main piston and normally bearing on a portion of the front face thereof, with a portion of said piston next the main piston exposed to atmospheric pressure, the opposite side of said portion being exposed to train-pipe pressure, a spring-operated check-valve adapted to close the passage to the outer air, a rigid arm connected to the main piston and passing through the hollow portion of the cylindrical piston and normally holding said valve off its seat, means operated by a slight reduction of train-pipe pressure for simultaneously moving said pistons, and supplying reduced pressure to the brake-cylinder, and means operated by a sudden reduction of train-pipe pressure for separating said pistons, and supplying great pressure to the brake-cylinder, substantially as described.

18. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing with port located near the front face thereof, of the hollow main piston sliding in said short cylinder, with a port through the walls of said piston, the sliding hollow cylindrical piston in front of the main piston and normally bearing on a portion of the front face thereof, with a longitudinal port therethrough, and a valve projecting from the main piston and closing said port during a portion only of the rearward travel of said main piston, piston-rings on said cylindrical piston, and cylinders inclosing piston-rings with ports to said cylinders, and means operated by the motion of said main piston for closing said air-passage, substantially as described.

19. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing with port located near the front face thereof, of the hollow main piston sliding in said short cylinder and closing said port early in its stroke, with a port through the walls of said piston, the sliding hollow cylindrical piston in front of the main piston and normally bearing on a portion of the front face thereof with a longitudinal port therethrough, and a valve projecting from the main piston and closing said port during a portion only of the rearward travel of the main piston, means operated by a slight reduction of train-pipe pressure for simultaneously moving said pistons and supplying reduced pressure to the brake-cylinder, and means operated by a sudden reduction of train-pipe pressure for separating said piston and supplying great pressure to the brake-cylinder, substantially as described.

20. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing, with port located near the front face thereof, of the hollow main piston sliding in said short cylinder with a port through the walls of said piston, the sliding hollow cylindrical piston in front of the main piston and normally bearing on a portion of the front face thereof, with piston-rings on said cylindrical piston, and cylinders inclosing said piston-rings with ports to said cylinders, and air-passages normally opening from the atmosphere into the rear end of one of said cylinders, means operated by the motion of said main piston for closing the connection to the atmosphere, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinders, substantially as described.

21. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said casing, of the hollow main piston sliding in said short cylinder, and having a greater surface on the rear thereof exposed to train-pipe pressure than on the front thereof, with a port extending through the walls thereof adapted to be closed near the end of the stroke of the main piston, with a portion of the front surface thereof normally exposed to atmospheric pressure, the sliding hollow cylindrical piston in front of the main piston and normally bearing on a portion of the front face thereof, means operated by the motion of said main piston for closing said air-passage, with a portion of said piston next the main piston exposed to atmospheric pressure, the opposite side of said piston being exposed to train-pipe pressure, a by-passage with a check-valve controlling the same for admitting train-pipe pressure to the brake-cylinder when the pressure in the chambers connected to the brake-cylinder is low, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

22. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing with port located near the front face thereof, of the hollow main piston sliding in said short cylinder and closing said port early in its stroke, with a port through the walls of said piston, the sliding hollow cylindrical piston in front of the main piston and normally bearing on a portion of the front face thereof, with means for regulating the motion thereof, a by-passage with a check-valve controlling the same for admitting train-pipe pressure to the brake-cylinder when the pressure in the chambers connected to the brake-cylinder is low, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

23. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing with port located near the front face thereof, of the hollow main piston sliding in said short cylinder, with a port through the walls of said piston, the sliding hollow cylindrical piston in front of the main piston and normally bearing on a portion of the front face thereof, with piston-rings on said cylindrical piston, and cylinders inclosing said piston-rings with ports to said cylinders, means operated by the motion of said main piston for closing said air-passage, a by-passage with a check-valve controlling the same for admitting train-pipe pressure to the brake-cylinder when the pressure in the chambers connected to the brake-cylinder is low, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

24. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing with port located near the front face thereof, of the hollow main piston sliding in said short cylinder and closing said port early in its stroke, with a port through the walls of said piston, the sliding hollow cylindrical piston in front of the main piston and normally bearing on a portion of the front face thereof with a longitudinal port therethrough, with means for regulating the motion thereof, a by-passage with a check-valve controlling the same for admitting train-pipe pressure to the brake-cylinder when the pressure in the chambers connected to the brake-cylinder is low, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

25. In a triple-valve mechanism, the combination with the outer casing with internal mechanism dividing the same into two irregular compartments, the one normally connected to the reservoir and the train-pipe, and the other normally connected to the brake-cylinder and the atmosphere, and the short cylinder in the rear end of said outer casing, with port located near the front face thereof, of the hollow main piston sliding in said short cylinder with a port through the walls of said piston, the sliding hollow cylindrical piston in front of the main piston and normally bearing on a portion of the front face thereof with a longitudinal port therethrough, with piston-rings on said cylindrical piston, and cylinders inclosing said piston-rings with ports to said cylinders, means operated by the motion of said main piston for closing said air-passage, a by-passage with a check-valve controlling the same for admitting train-pipe pressure to the brake-cylinder when the pressure in the chambers connected to the brake-cylinder is low, means operated by a slight reduction of train-pipe pressure for simultaneously moving said pistons and supplying reduced pressure to the brake-cylinder, and means operated by a sudden reduction of train-pipe pressure for separating said pistons and supplying great pressure to the brake-cylinder, substantially as described.

In testimony whereof I affix my signature in presence of two witnesses.

JOSEPH GALES HOLCOMBE.

Witnesses:
JNO. BUCKLEY,
WM. MATTHEWS.